United States Patent
Matsumoto et al.

(10) Patent No.: US 11,042,726 B2
(45) Date of Patent: Jun. 22, 2021

(54) SKIN ANALYZER, SKIN ANALYSIS METHOD, AND NON-TRANSITORY COMPUTER-READABLE RECORDING MEDIUM

(71) Applicant: Panasonic Intellectual Property Management Co., Ltd., Osaka (JP)

(72) Inventors: Hiroshi Matsumoto, Kanagawa (JP); Hiroki Taoka, Kyoto (JP); Ichiro Takei, Tokyo (JP); Akio Nishimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 16/589,334

(22) Filed: Oct. 1, 2019

(65) Prior Publication Data

US 2020/0143147 A1 May 7, 2020

(30) Foreign Application Priority Data

Nov. 5, 2018 (JP) .............................. JP2018-208075
Jun. 6, 2019 (JP) .............................. JP2019-106043

(51) Int. Cl.
*G06K 9/00* (2006.01)
*G06K 9/32* (2006.01)

(52) U.S. Cl.
CPC ..... *G06K 9/00281* (2013.01); *G06K 9/00255* (2013.01); *G06K 9/3233* (2013.01)

(58) Field of Classification Search
CPC ........... G06K 9/00281; G06K 9/00255; G06K 9/3233; G06K 9/00228; G06K 9/00221
See application file for complete search history.

(56) References Cited

U.S. PATENT DOCUMENTS

| 2011/0116691 | A1* | 5/2011 | Chung | ................... | A61B 5/442 382/128 |
| 2012/0133753 | A1* | 5/2012 | Chang | ................ | G06K 9/00221 348/77 |
| 2012/0275668 | A1* | 11/2012 | Chou | .................... | G06T 7/0012 382/118 |
| 2015/0099947 | A1* | 4/2015 | Qu | ......................... | A61B 5/442 600/306 |

(Continued)

FOREIGN PATENT DOCUMENTS

| EP | 3219250 A1 | 9/2017 |
| WO | 2015/015793 | 2/2015 |

OTHER PUBLICATIONS

The Extended European Search Report dated Mar. 25, 2020 for the related European Patent Application No. 19206104.2.

*Primary Examiner* — Wesley J Tucker
(74) *Attorney, Agent, or Firm* — Greenblum & Bernstein, P.L.C.

(57) ABSTRACT

A skin analyzer includes a facial part recognition unit that recognizes a facial part from a face image of a user captured by a camera; a UI unit that causes a display to display a UI in which a facial part mark indicating the facial part is disposed on a face image, and that accepts an operation with respect to the facial part mark; an analysis region setting unit that sets a skin analysis region for the face image based on a position of the operated facial part mark; and a skin analysis performing unit that performs a skin analysis on the set skin analysis region.

9 Claims, 18 Drawing Sheets

(56) References Cited

U.S. PATENT DOCUMENTS

| | | | |
|---|---|---|---|
| 2015/0261996 A1* | 9/2015 | Kim | H04N 5/23293 |
| | | | 348/14.03 |
| 2016/0128450 A1* | 5/2016 | Saito | G06K 9/00664 |
| | | | 345/633 |
| 2016/0162728 A1* | 6/2016 | Arai | G06K 9/4609 |
| | | | 382/118 |
| 2016/0189413 A1* | 6/2016 | Houjou | G06K 9/00281 |
| | | | 382/118 |
| 2017/0270348 A1* | 9/2017 | Morgana | G06K 9/00912 |
| 2017/0340267 A1* | 11/2017 | Shen | A61B 5/7445 |
| 2018/0085048 A1* | 3/2018 | Lee | G06F 3/0484 |
| 2020/0167549 A1* | 5/2020 | Taoka | H04N 5/23219 |
| 2020/0167552 A1* | 5/2020 | Taoka | G06K 9/00281 |

* cited by examiner

SKIN ANALYZER, SKIN ANALYSIS METHOD, AND NON-TRANSITORY COMPUTER-READABLE RECORDING MEDIUM

BACKGROUND

1. Technical Field

The present disclosure relates to a skin analyzer, a skin analysis method, and a non-transitory computer-readable recording medium.

2. Description of the Related Art

Conventionally, based on a face image obtained by photographing the user's face, the facial skin condition is analyzed, and visualization and quantification of analysis results are conducted. In International Publication No. 2015/015793 discloses a device that automatically recognizes the position of the facial part from the face image, and automatically sets a region to be analyzed on skin (hereinafter referred to as a "skin analysis region") based on the position of the recognized facial part.

SUMMARY

However, as in International Publication No. 2015/015793, when the position of facial parts such as the eyes, the nose and the mouth are automatically recognized from the face image, the recognition result may be incorrect. In such a case, the device of International Publication No. 2015/015793 can not easily correct the recognition result of the facial part.

One non-limiting and exemplary embodiment provides a skin analyzer, a skin analysis method, and a non-transitory computer-readable recording medium that can easily correct recognition of a facial part in a face image.

In one general aspect, the techniques disclosed here feature a skin analyzer including a facial part recognition unit that recognizes a facial part from a face image of a user captured by a camera, a UI unit that causes a display to display a user interface (UI) in which a facial part mark indicating the facial part is disposed on a face image, and that accepts an operation with respect to the facial part mark, an analysis region setting unit that sets a skin analysis region for the face image based on a position of the operated facial part mark, and a skin analysis performing unit that performs a skin analysis on the set skin analysis region.

The general or specific aspect may be implemented by a system, a method, an integrated circuit, a computer program, or a recording medium, or may be implemented as any combination of the system, the device, the method, the integrated circuit, the computer program and the recording medium.

According to an aspect of the present disclosure, recognition of the facial part to the face image can be easily corrected.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
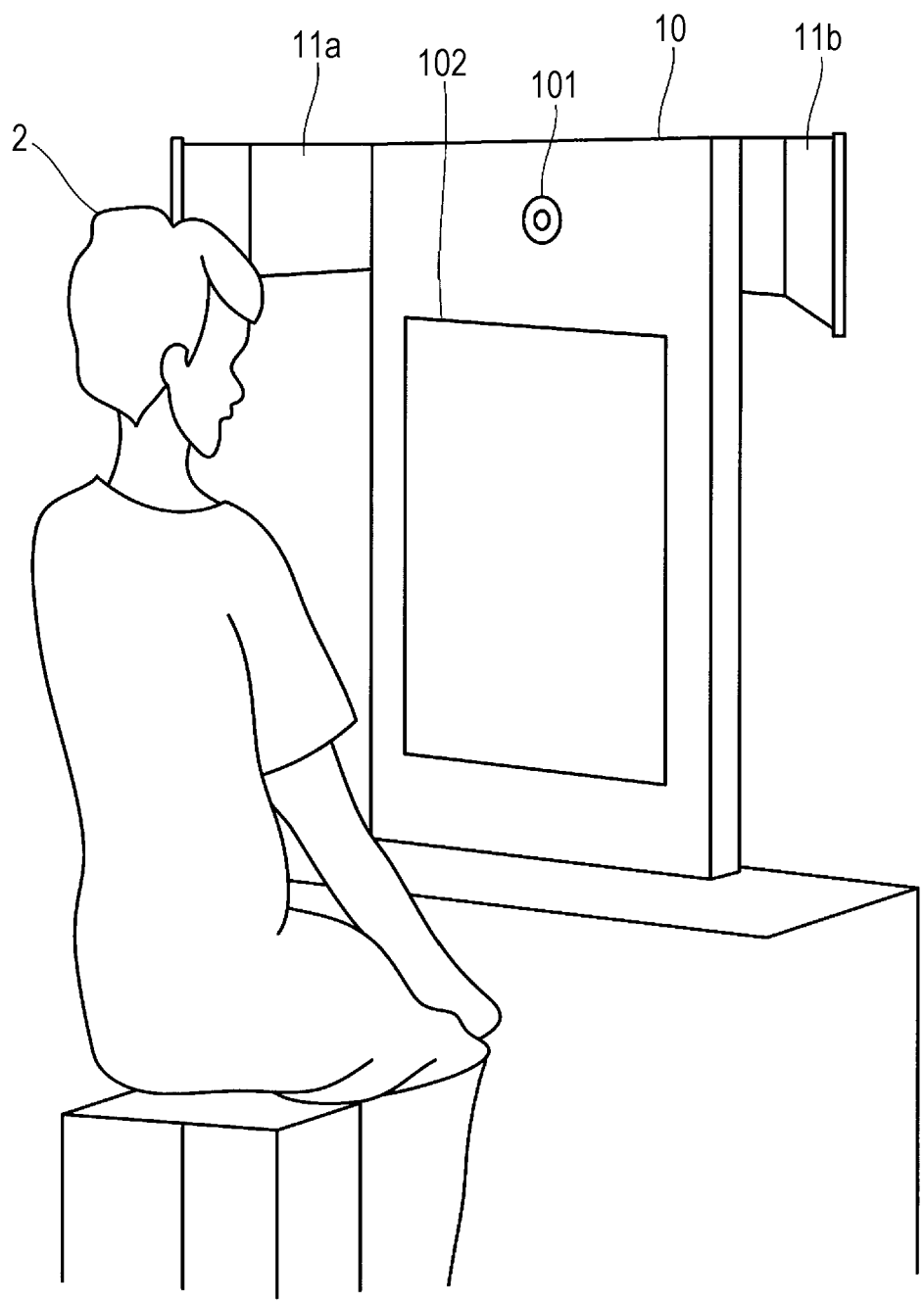
FIG. 1 is a diagram showing an application example of a skin analyzer according to an embodiment.

Hereinafter, referring to the drawings as appropriate, embodiments of the present disclosure will be described in detail. However, descriptions more detailed than necessary may be omitted. For example, detailed description of already well-known matters and redundant description of substantially the same configuration may be omitted. This is to avoid unnecessary redundancy in the following description and to facilitate understanding by those skilled in the art.

An Embodiment

Overview of Skin Analyzer

Figure 2:
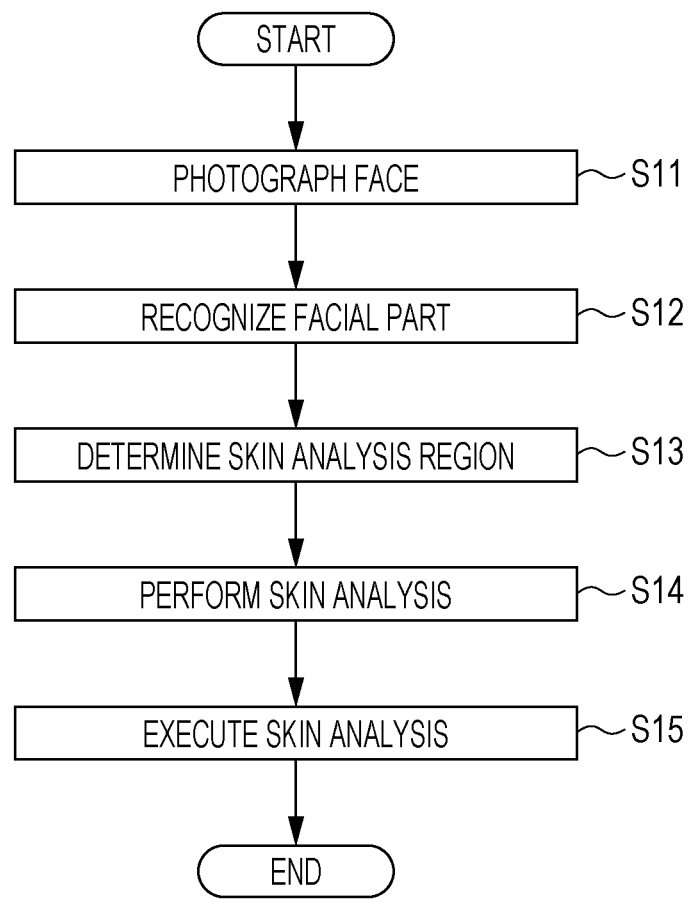
FIG. 2 is a flowchart showing an outline of the operation of the skin analyzer according to an embodiment.

FIG. 1 shows an application example of the skin analyzer. The flowchart of FIG. 2 shows an example of an operation outline of the skin analyzer. Next, referring to FIGS. 1 and 2, the outline of the skin analyzer will be described.

As shown in FIG. 1, a user 2 sitting in front of a skin analyzer 10 instructs the skin analyzer 10 to start the skin analysis. In response to the start instruction, the skin analyzer 10 starts the following operation.

The skin analyzer 10 causes a camera 101 to capture the face of the user 2 (S11). Hereinafter, an image of the face of the user 2 captured by the camera 101 is expressed as a "face image".

The skin analyzer 10 recognizes the facial part from the face image taken in S11 (S12). The facial part is a featured part in the face such as, for example, the facial contour, the eyes, the nose, the mouth, the eyebrows and the hairline of hair. The facial part may be expressed as a face part, a face organ, or a face feature portion.

The skin analyzer 10 sets a region to be subjected to the skin analysis (hereinafter referred to as "skin analysis region") in the face image based on the position of the facial part recognized in S12 and the like (S13).

The skin analyzer 10 performs the skin analysis on the skin analysis region set in S13 (S14).

The skin analyzer 10 displays the result of the skin analysis performed in S14 on a display 102 (S15).

As mentioned above, the user 2 uses the skin analyzer 10 to easily receive skin analysis. The details will be described below.

Configuration of Skin Analyzer

Figure 3:
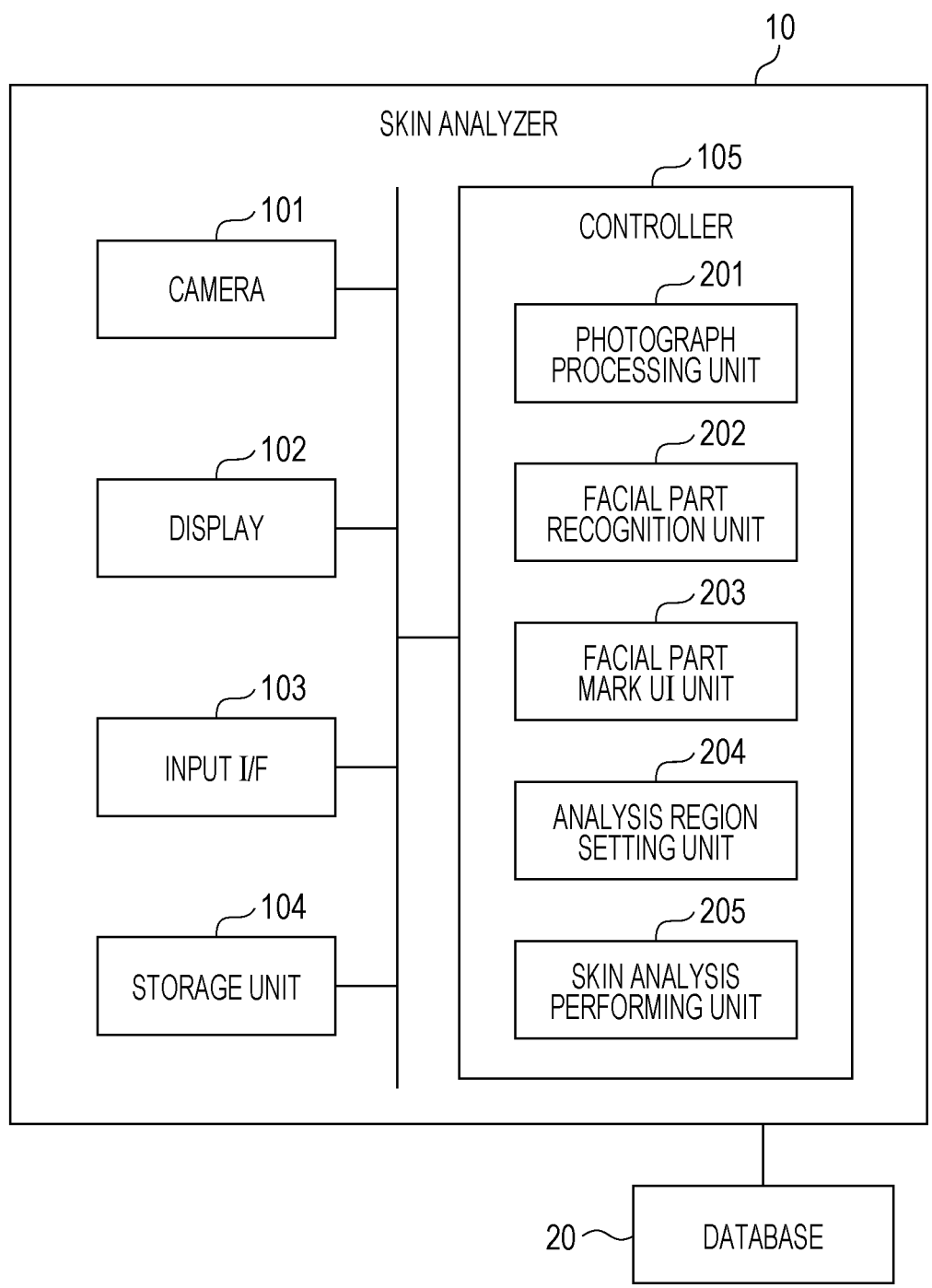
FIG. 3 is a diagram showing an example of the configuration of the skin analyzer according to an embodiment.

Next, referring to FIG. 3, the configuration of the skin analyzer 10 will be described.

The skin analyzer 10 includes, for example, the camera 101, the display 102, an input I/F 103, a storage unit 104, and a controller 105. Also, the skin analyzer 10 may be connected to a database 20.

The camera 101 captures the face of the user 2. In FIG. 1, the camera 101 is built in the skin analyzer 10. The camera 101 may be a device separate from the skin analyzer 10. In this case, the camera 101 transmits the captured face image to the skin analyzer 10 through predetermined wired communication or wireless communication.

The display 102 displays an image, information, and the like. In FIG. 1, the display 102 is built in the skin analyzer 10. The display 102 may be a device separate from the skin analyzer 10. In this case, the skin analyzer 10 transmits display data to the display 102 through predetermined wired communication or wireless communication.

The input I/F 103 receives an instruction from the user 2. The skin analyzer 10 may include a plurality of input I/Fs 103. For example, the skin analyzer 10 includes, as the input I/F 103, a touch panel, a mouse, a keyboard, a button for photographing instruction, a microphone for voice input, and the like. Also, the input I/F 103 may be a device separate from the skin analyzer 10. In this case, the input I/F 103 transmits the input data to the skin analyzer 10 through predetermined wired communication or wireless communication.

The storage unit 104 stores data used by the controller 105. The storage unit 104 may be a volatile memory such as a dynamic random access memory (DRAM), or may be a non-volatile memory such as a solid state drive (SSD). Alternatively, the storage unit 104 may be a combination thereof.

The controller 105 is, for example, a central processing unit (CPU), and implements the function of the skin analyzer 10. For example, the controller 105 executes the computer program stored in the storage unit 104 to implement the functions related to a photograph processing unit 201, a facial part recognition unit 202, a facial part mark UI unit 203, an analysis region setting unit 204, and a skin analysis performing unit 205, which will be described later.

The photograph processing unit 201 controls the camera 101 to capture the face of the user 2 to generate a face image. The photograph processing unit 201 may display the face image being captured by the camera 101 on the display 102 in real time. As a result, while the user 2 looks at the display 102, the user 2 can adjust the position and orientation of the face so that the face can be correctly photographed.

The photograph processing unit 201 may also capture the front face, the left side face, and the right side face of the user 2. As shown in FIG. 1, the skin analyzer 10 may include a mirror 11a on the left side of the camera 101 when viewing from the user 2, and a mirror 11b on the right side of the camera 101 when viewing from the user 2 so that the left side face and the right side face are photographed properly. The orientation (angle) of the left mirror 11a is an orientation (angle) in which the camera 101 can capture an appropriate right side face of the user 2 when the user 2 directs the face so that the front face is reflected in the left mirror 11a. The orientation (angle) of the right mirror 11b is an orientation (angle) in which the camera 101 can capture an appropriate left side face of the user 2 when the user 2 directs the face so that the front face is reflected in the right mirror 11b.

Figure 4:
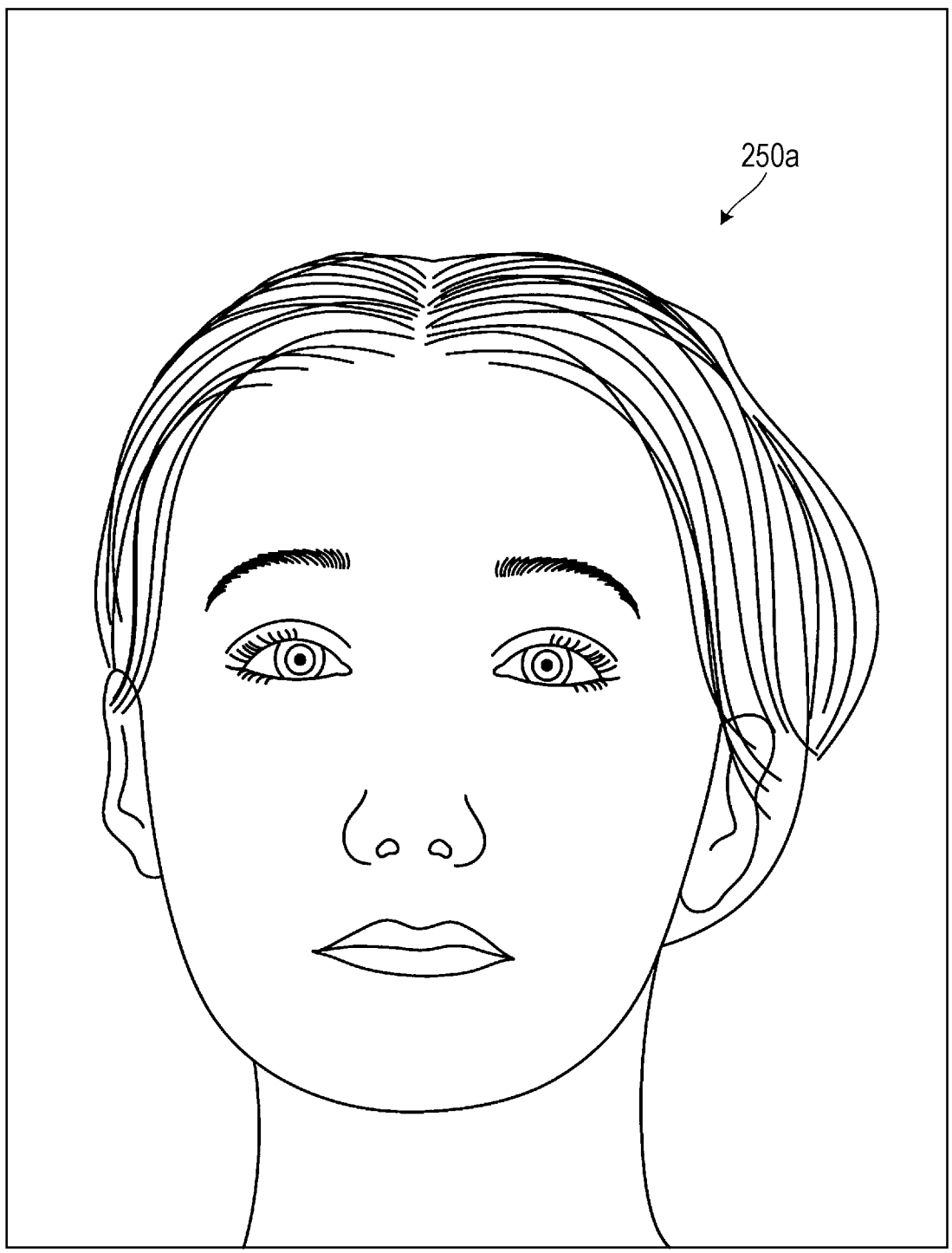
FIG. 4 is a diagram showing an example of a face image of a front face captured by the skin analyzer according to an embodiment.
Figure 5:
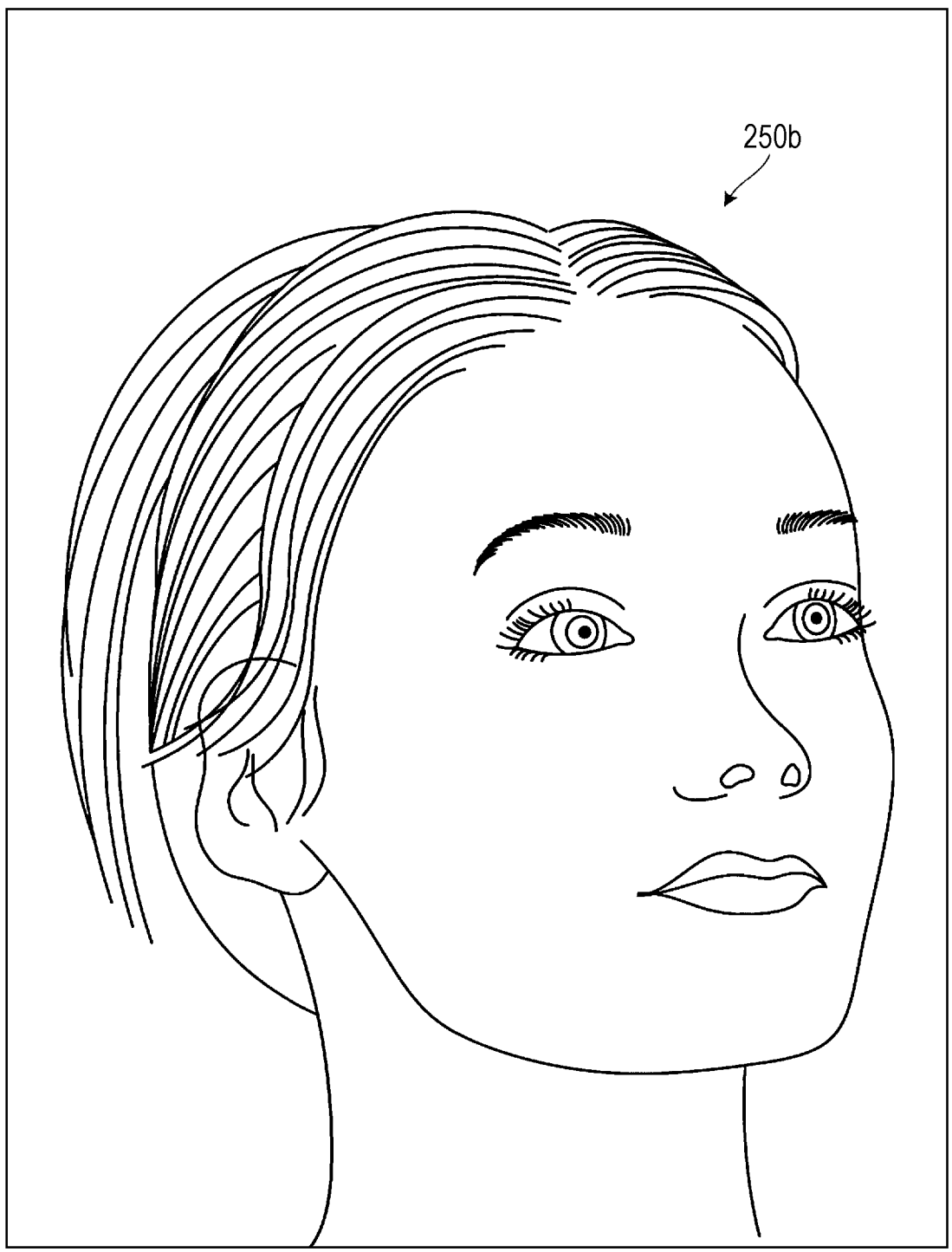
FIG. 5 is a diagram showing an example of a face image of a right side face captured by the skin analyzer according to an embodiment.
Figure 6:
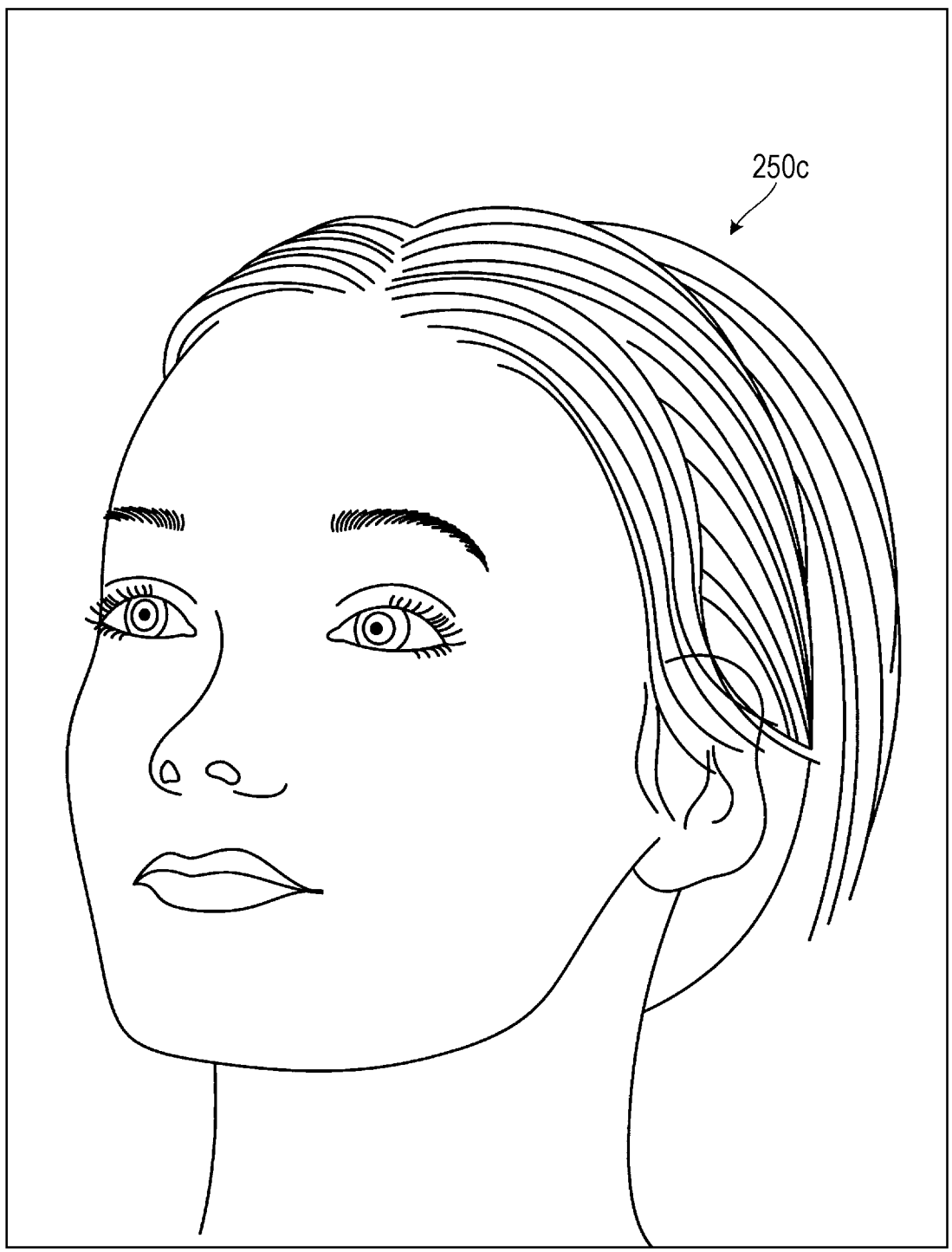
FIG. 6 is a diagram showing an example of a face image of a left side face captured by the skin analyzer according to an embodiment.

In addition, at the time of photographing, the photograph processing unit 201 may instruct the user 2 to face the front, and cause the camera 101 to capture the front face. FIG. 4 shows an example of a face image 250a obtained by photographing the front face of the user 2. Next, the photograph processing unit 201 may instruct the user 2 to turn the face so that the front face is reflected in the left mirror 11a, and cause the camera 101 to capture the right side face. FIG. 5 shows an example of a face image 250b obtained by photographing the right side face of the user 2. Finally, the photograph processing unit 201 may instruct the user 2 to turn the face so that the front face is reflected in the right mirror 11b, and cause the camera 101 to capture the left side face. FIG. 6 shows an example of a face image 250c obtained by photographing the left side face of the user 2. Hereinafter, when the front face, the left side face and the right side face are not distinguished, they are expressed as a face image 250.

The facial part recognition unit 202 recognizes a facial part, for example, by the following process. That is, the facial part recognition unit 202 first uses a known image processing technique to extract the feature points from the face image 250. Next, the facial part recognition unit 202 recognizes the facial part such as the facial contour, the eyes, the nose, the mouth, the eyebrows and the hairline of hair from the extracted feature points.

However, when extraction accuracy of the feature points is low, the facial part recognition unit 202 may fail to recognize the facial part. Also, even when the facial part recognition unit 202 determines that recognition of the facial part is successful, in practice, the position of the facial part may not be recognized correctly. In such a case, the skin analyzer 10 according to the present embodiment can efficiently correct the recognition of the facial part.

Figure 8:
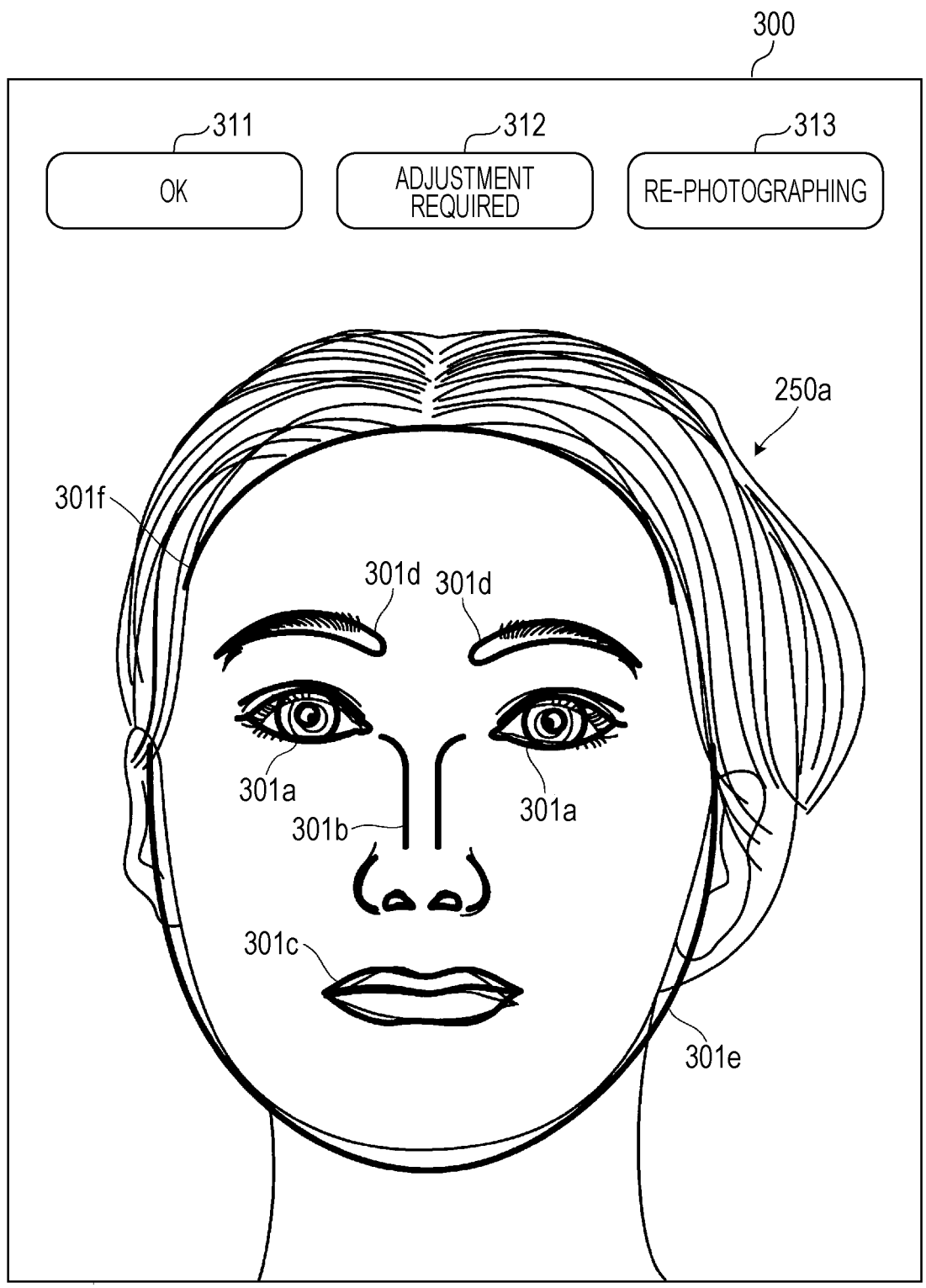
FIG. 8 is a diagram showing an example of a front face recognition result validation UI according to an embodiment.

The facial part mark UI unit 203 displays, on the display, a facial part mark UI in which the facial part mark is disposed on the face image, and accepts the operation for the facial part mark. As shown in FIG. 8, the facial part mark a mark (illustration) which shows each facial part. For example, a facial part mark indicating the facial part "eye"

is an eye mark (illustration), and a facial part mark 301 indicating the facial part "mouth" is a mouth mark (illustration).

When the facial part recognition unit 202 determines that recognition of the facial part is successful, the facial part mark UI unit 203 may dispose the facial part mark indicating the facial part at the position of the recognized facial part.

When the facial part recognition unit 202 determines that recognition of the facial part is unsuccessful, the facial part mark UI unit 203 may dispose the facial part mark at a predetermined position. Alternatively, when the facial part recognition unit 202 determines that recognition of the facial part is unsuccessful, the facial part mark UI unit 203 may dispose, in the face image, the facial part mark when recognition of the facial part was successful in another face image of the user 2 (for example, a past face image). Alternatively, when the facial part recognition unit 202 determines that recognition of the facial part is unsuccessful, the facial part mark UI unit 203 may dispose, in the face image, the facial part mark disposed by the operation with respect to another face image of the user 2 (for example, a past face images). The details of the facial part mark UI unit 203 will be described later.

The analysis region setting unit 204 sets at least one skin analysis region in the face image based on the position of the facial part mark disposed by the facial part mark UI unit 203. Note that the analysis region setting unit 204 may set a skin analysis region in the face image based on the position of each facial part recognized by the facial part recognition unit 202. The details of the analysis region setting unit 204 will be described later.

The skin analysis performing unit 205 performs a skin analysis on each skin analysis region set in the face image by the analysis region setting unit 204. For example, the skin analysis performing unit 205 applies known image processing to the inside of the skin analysis region in the face image to analyze the amount of wrinkles, stains and/or pores.

The database 20 manages the face image of each user 2 and the skin analysis result of the face image in association with each other. In FIG. 3, the database 20 is a device separate from the skin analyzer 10. The database 20 may be built in the skin analyzer 10.

Details of Facial Part Mark UI Unit

Next, referring to the flowchart shown in FIG. 7, details of the facial part mark UI unit 203 will be described. When capturing three face images 250*a*, 250*b*, and 250*c* of a front face, a left side face and a right side face, the facial part recognition unit 202 may implement the flowchart with respect to each of the face images 250*a*, 250*b*, and 250*c*.

The facial part recognition unit 202 uses a known image processing technique to recognize the facial part from the face image 250 (S101). The facial part recognition unit 202 determines whether recognition of the facial part is successful (S102). For example, when the facial part recognition unit 202 can recognize all facial parts such as the facial contour, the eyes, the nose, the mouth, the eyebrows and the hairline of hair, the facial part recognition unit 202 determines that the recognition is successful. Alternatively, when the facial part recognition unit 202 can recognize at least one of the facial parts, the facial part recognition unit 202 may determine that the recognition is successful. Alternatively, when the facial part recognition unit 202 compares the face image 250*a* of the front face, the face image 250*b* of the right side face, and the face image 250*c* of the left side face, and at least two face sizes differ by a predetermined amount or more, the facial part recognition unit 202 may determine that recognition is unsuccessful.

When the facial part recognition unit 202 performs recognition in S101, and determines that it has failed in recognizing the facial part (S102: NO), the facial part mark UI unit 203 displays, on the display 102, a facial part mark UI 500 in which the facial part mark is disposed at the default position (see FIG. 13), and accepts the operation from the user 2 (S103). The user 2 operates the facial part mark UI 500 manually to dispose the facial part mark 301 (see FIG. 8) indicating the facial part at the correct position of each facial part of the face image (S104).

When the facial part mark UI unit 203 receives a completion instruction from the user 2, the facial part mark UI unit 203 determines the position of the facial part mark 301 redisposed by the user 2 (S105). This flow ends.

When the facial part recognition unit 202 performs recognition in S101, and determines that recognition of the facial part is successful (S102: YES), the facial part mark UI unit 203 displays, on the display 102, a facial part mark UI 300 in which the facial part mark 301 is disposed at the position recognized by the facial part recognition unit 202 (see FIGS. 8, 9, and 10) (S106), and accepts the operation from the user 2.

The user 2 looks at the facial part mark UI 300, and determines whether the facial part mark 301 indicating the facial part is correctly disposed at the position of each facial part of the face image (S107).

When the user 2 determines that the facial part mark 301 is correctly disposed (S107: YES), the facial part mark UI unit 203 determines the position of the facial part mark 301 disposed (S108). This flow ends.

When the user 2 determines that the facial part mark 301 is not correctly disposed (S107: NO), the facial part mark UI unit 203 displays, on the display 102, a facial part mark UI 400 (see FIGS. 11 and 12) in which the facial part mark 301 is disposed at the position recognized by the facial part recognition unit 202, and accepts the operation from the user 2 (S109). The user 2 operates the facial part mark UI 400 manually to redispose the facial part mark 301 indicating the facial part at the correct position of each facial part of the face image (S110).

When the facial part mark UI unit 203 receives a completion instruction from the user 2, the facial part mark UI unit 203 determines the position of the facial part mark 301 redisposed by the user 2 (S111). This flow ends.

Example of Facial Part Mark UI

Figure 7:
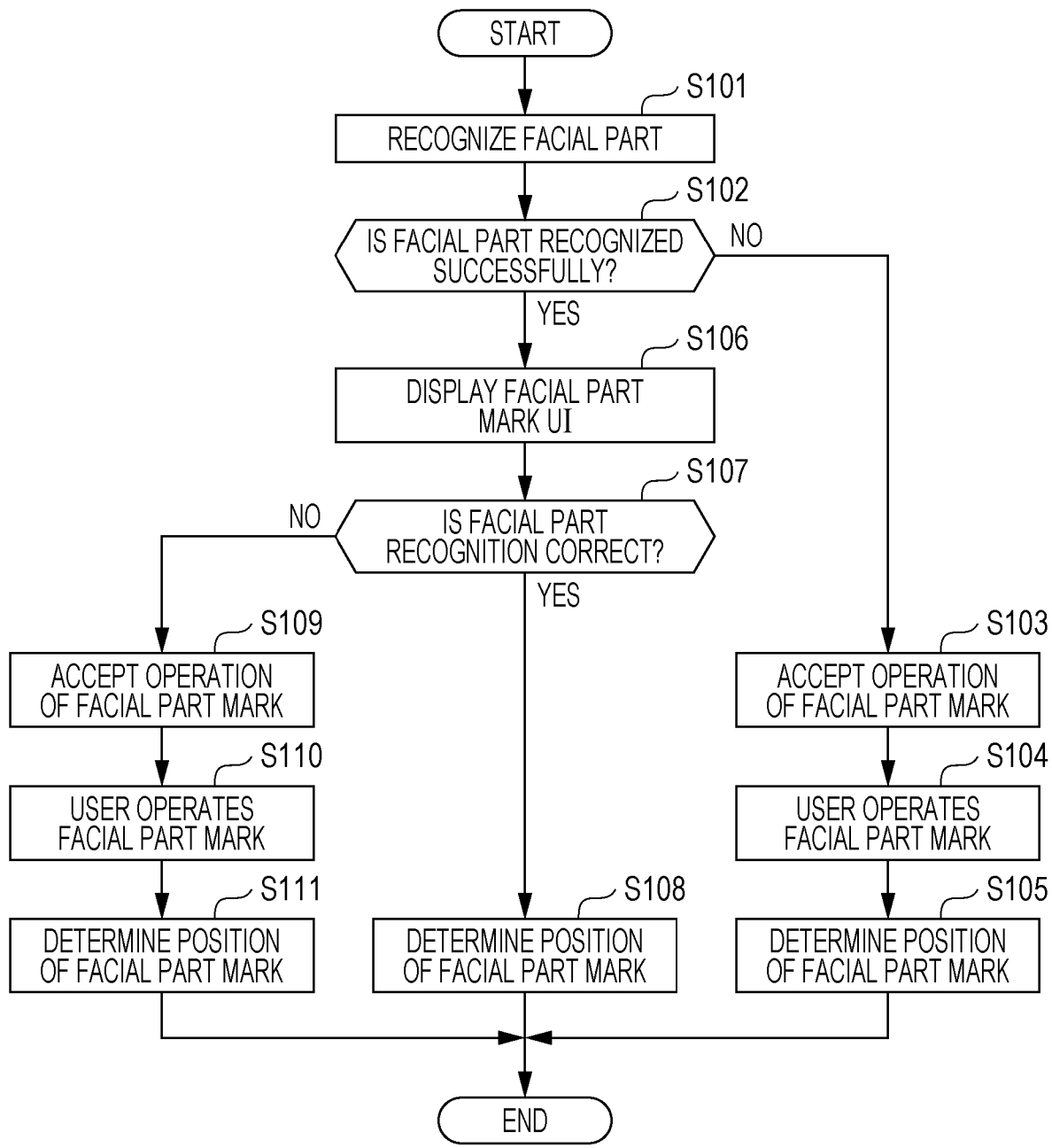
FIG. 7 is a flowchart showing an example of processing of a facial part recognition unit according to an embodiment.
Figure 9:
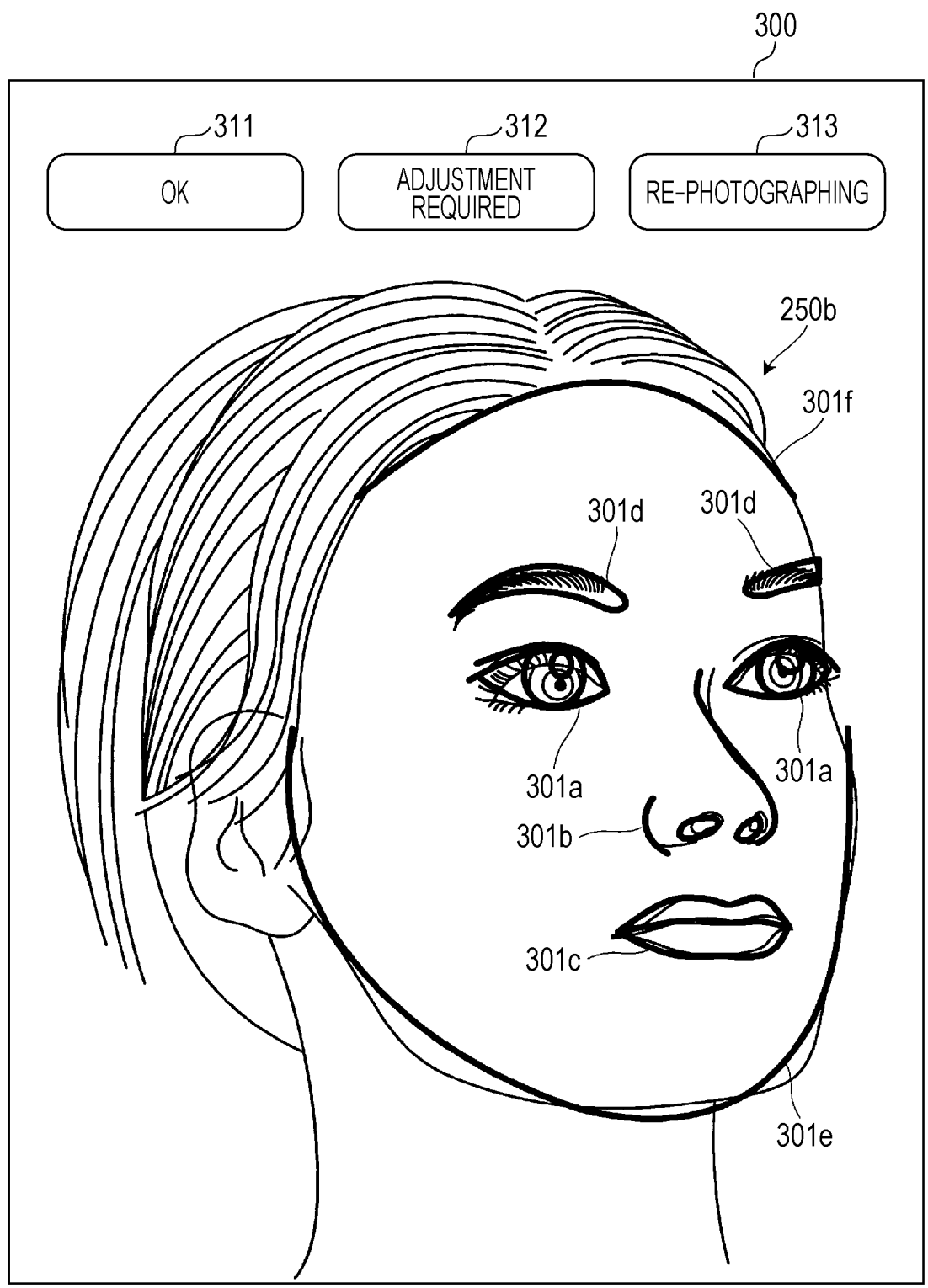
FIG. 9 is a diagram showing an example of a left side face recognition result validation UI according to an embodiment.
Figure 10:
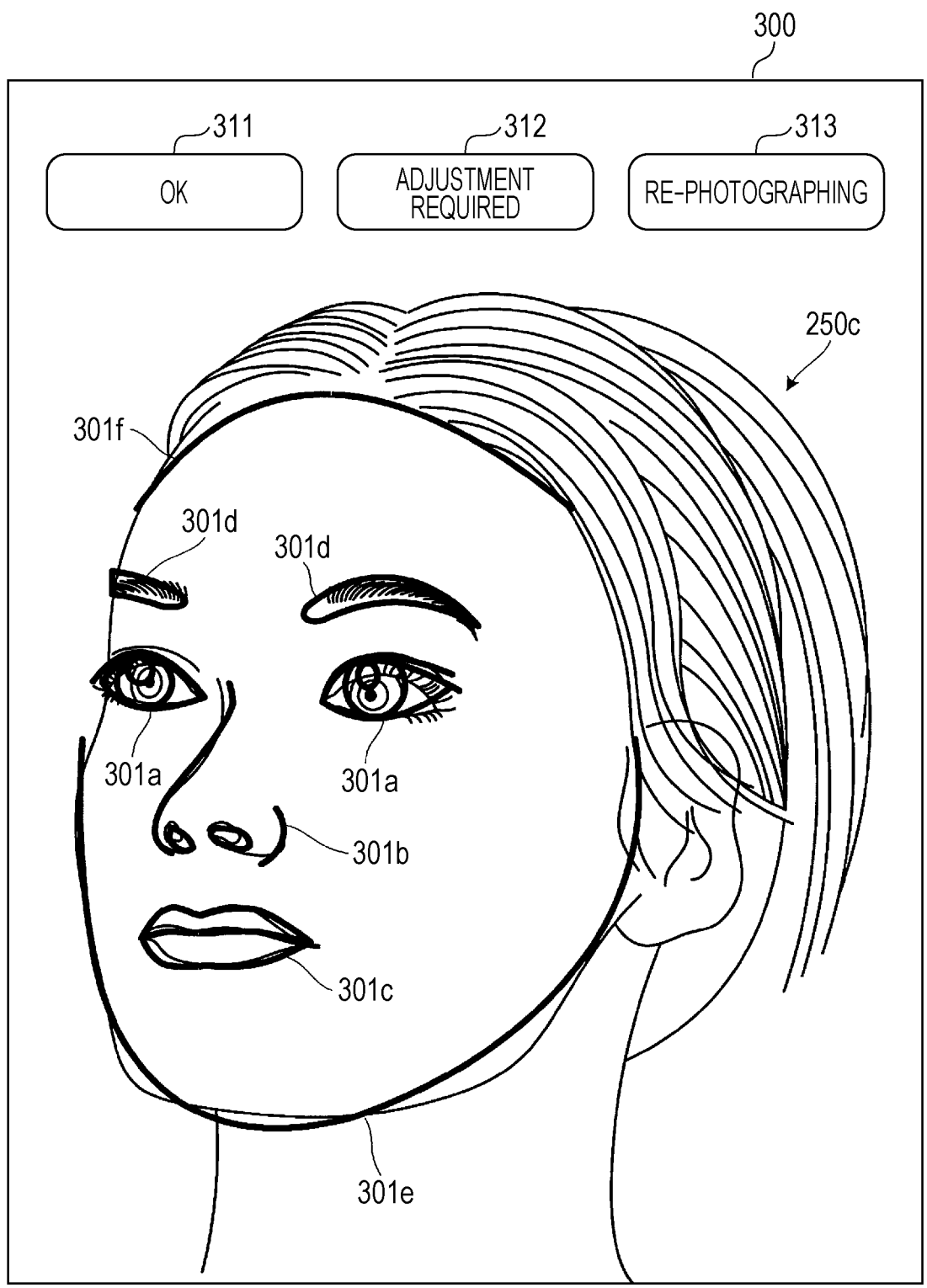
FIG. 10 is a diagram showing an example of a right side face recognition result validation UI according to an embodiment.

FIGS. 8, 9 and 10 show an example of the facial part mark UI 300 displayed in S106 of FIG. 7. FIGS. 8, 9 and 10 show an example in which recognition of the facial part is successful, and the facial part mark 301 is correctly disposed. Further, FIG. 8 shows an example of the facial part mark UI 300 of the front face, FIG. 9 shows an example of the facial part mark UI 300 of the right side face, and FIG. 10 shows an example of the facial part mark UI 300 of the left side face.

As shown in FIGS. 8, 9 and 10, when recognition of the facial part is successful, the facial part mark UI unit 203 generates the facial part mark UI 300 in which the facial part mark 301 indicating the facial part is disposed at the position of the recognized facial part of the face image to display it on the display 102.

In FIGS. 8, 9 and 10, a facial part mark 301*a* of the eyes is correctly disposed at the eye position of the face image. In addition, a facial part mark 301*b* of the nose is correctly disposed at the position of the nose of the face image. In addition, a facial part mark 301c of the mouth is correctly disposed at the position of the mouth of the face image. In addition, a facial part mark 301d of the eyebrows is correctly disposed at the position of the eyebrows of the face image. A facial part mark 301e of the facial contour is correctly disposed at the position of the contour from the jaw to the ears of the face image. In addition, a facial part mark 301f at the hairline of hair is correctly disposed at the position of the hairline of hair of the face image.

In the case where all the facial part marks 301 is correctly disposed on the facial part of the face image, the user 2 presses an OK button 311. In this case, the result of S107 of FIG. 7 is determined to be "YES".

When at least one facial part mark 301 is not correctly disposed on the facial part of the face image, the user 2 presses an adjustment required button 312. In this case, the result of S107 of FIG. 7 is determined to be "NO", and the facial part mark UI 400 is displayed in S109 of FIG. 7. Note that the user 2 may select the OK button 311 or the adjustment required button 312 with respect to each of the face images shown in FIGS. 8, 9 and 10. In this case, the facial part mark UI unit 203 may display the facial part mark UI 400 only for the face image when the adjustment required button 312 is pressed.

Further, when the user 2 presses a re-photographing button 313 shown in FIGS. 8, 9 and 10, the flow shown in FIG. 7 returns from S107 to S101, and the face may be re-photographed (not shown in FIG. 7). In this case, the photograph processing unit 201 may perform re-photographing only for the orientation of the face corresponding to the face image when the re-photographing button 313 is pressed.

Figure 11:
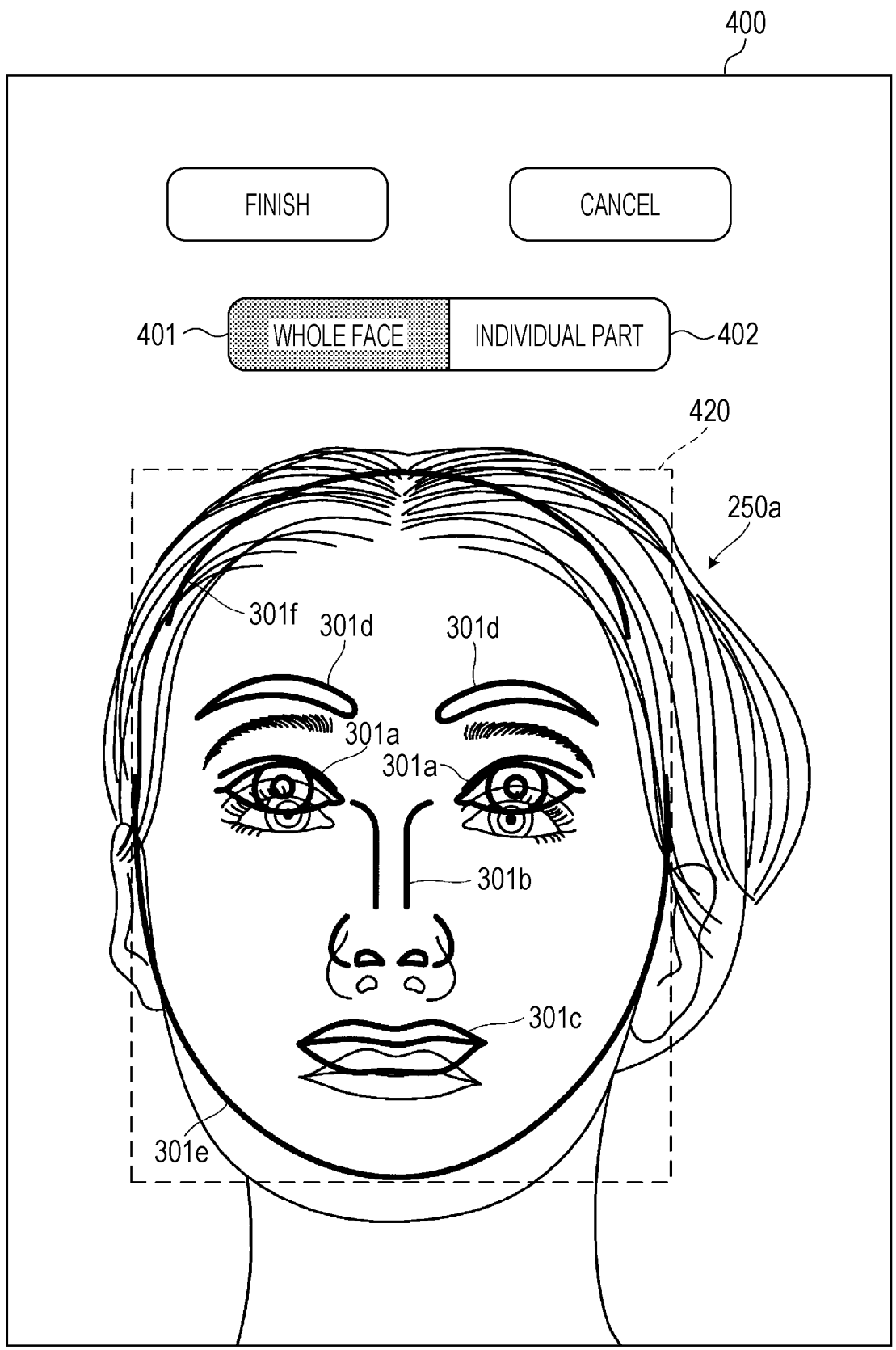
FIG. 11 is a diagram showing a first example of a facial part mark correction UI according to an embodiment.
Figure 12:
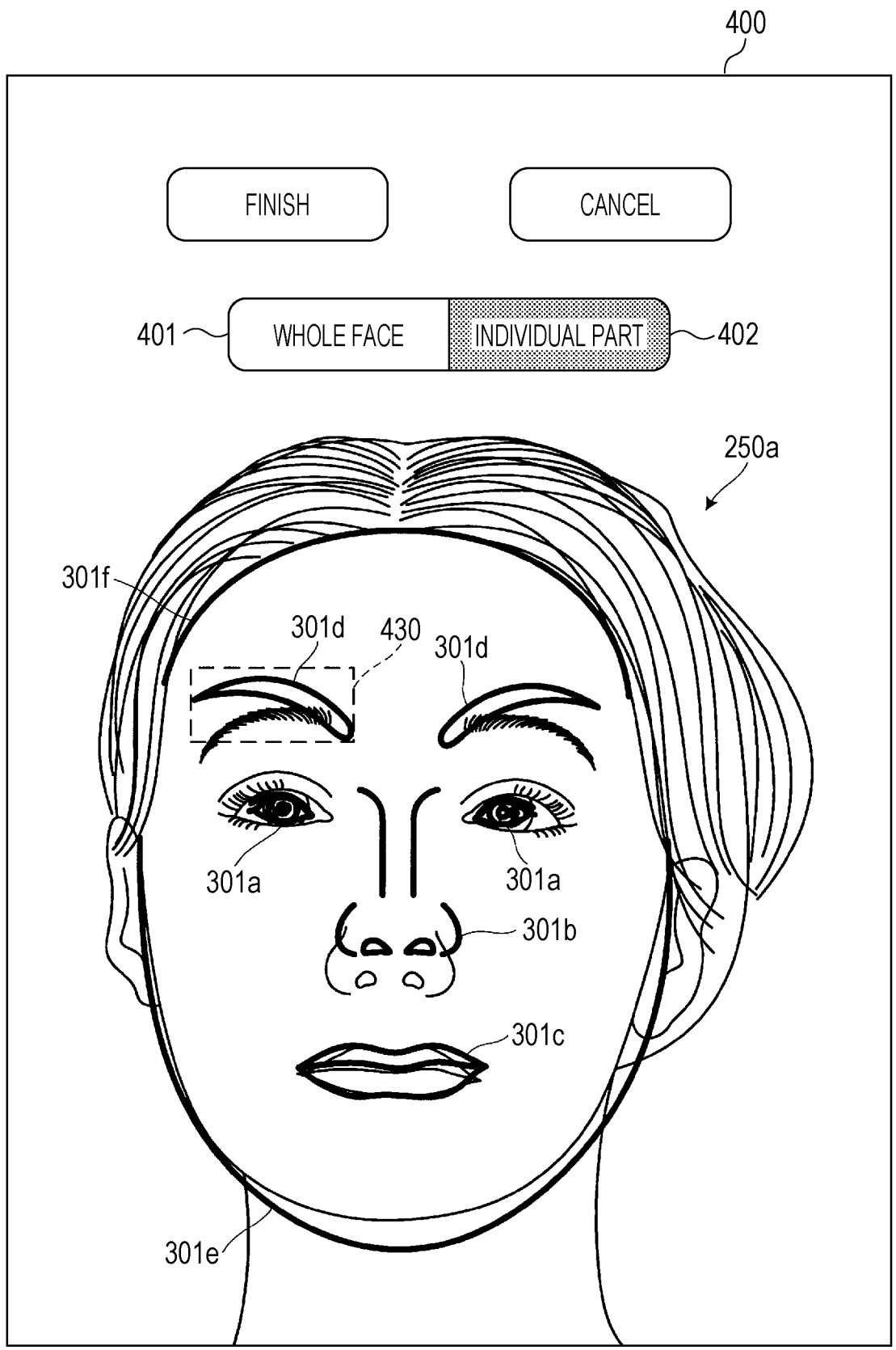
FIG. 12 is a diagram showing a second example of a facial part mark correction UI according to an embodiment.

FIGS. 11 and 12 show an example of the facial part mark UI 400 displayed in S109 of FIG. 7. As mentioned above, the facial part mark UI 400 is used when correction of the facial part mark is required although recognition of the facial part is successful.

The facial part mark UI 400 includes a whole face button 401 for collectively correcting all the facial part marks 301, and an individual part button 402 for correcting the facial part marks 301 individually. Also, as in FIGS. 8 to 10, in the facial part mark UI 400, the facial part mark 301 indicating the facial part is disposed at the position of the facial part recognized (incorrectly recognized) by the facial part recognition unit 202.

As shown in FIG. 11, when the position and/or the size of the facial part mark 301 is totally shifted, the user 2 may press the whole face button 401. When the whole face button 401 is pressed, all the facial part marks 301 are selected in the facial part mark UI 400 as shown by a dashed line 420. As a result, the user 2 can correct all the facial part marks 301 at one time. The correction may include at least one of the movement, the rotation, the zoom-in, the zoom-out, and the change of aspect ratio.

As shown in FIG. 12, when the position and/or the size of the individual facial part marks 301 are shifted, the user 2 may press the individual part button 402. When the individual part button 402 is pressed, individual facial part marks 301 can be selected in the facial part mark UI 400. The user 2 can selects the facial part mark 301 to be corrected as shown by a dashed line 430 to correct the selected facial part mark 301. The correction may include at least one of the movement, the rotation, the zoom-in, the zoom-out, and the change of aspect ratio.

For example, in the case of FIG. 12, since the size of the facial part mark 301a of the eyes is smaller than the size of the eyes of the face image, the user 2 may select the facial part mark 301a of the eyes, and may zoom in the facial part mark 301a of the eyes to fit it to the size of the eyes of the face image. Also, since the angle of the facial part mark 301d of the eyebrows is steeper than the angle of the eyebrows of the face image, the user 2 may select the facial part mark 301d of the eyebrows, and may rotate the facial part mark 301d of the eyebrows to fit it to the angle of the eyebrows of the face image. In addition, since the vertical length of the facial part mark 301b of the nose is shorter than the nose length of the face image, the user 2 may select the facial part mark 301b of the nose, and may change the aspect ratio of the facial part mark 301b of the nose to fit it the vertical length of the nose of the face image.

In addition, when the distance between the position of the facial part mark and the position of the facial part corresponding to the facial part mark is less than a predetermined distance, the facial part mark UI unit 203 may automatically snap the facial part mark 301 to the position of the facial part. In this case, the facial part mark UI unit 203 may perform partial pattern matching on the face image in the vicinity of the facial part mark 301 to recognize (that is, re-recognize) the facial part corresponding to the facial part mark to snap the facial part mark to the position of the recognized facial part. As a result, since the time for user 2 to finely adjust the facial part mark can be saved, the efficiency of the correction work of the facial part mark 301 is improved.

The facial part mark UI unit 203 may group the facial part marks 301 corresponding to facial component parts having high relevancy in positional relationship into one group. The facial component parts having high relevancy in positional relationship are facial component parts whose mutual distance to be positioned is relatively close, for example, like the eyes and the eyebrows, or the nose and the mouth, or facial component parts of the face interlocked with each other by a muscle or a skeleton. The facial part mark UI unit 203 may move the facial part marks 301 collectively by a unit of group. In the facial part mark UI when moving the facial part marks 301 by a unit of group, or when moving one facial part mark 301 instead of them by a unit of group, a button similar to the whole face button 401 or the individual part button 402 may be separately disposed. In addition, specific functions may be assigned for buttons of operation devices such as a keyboard and/or a mouse.

Figure 13:
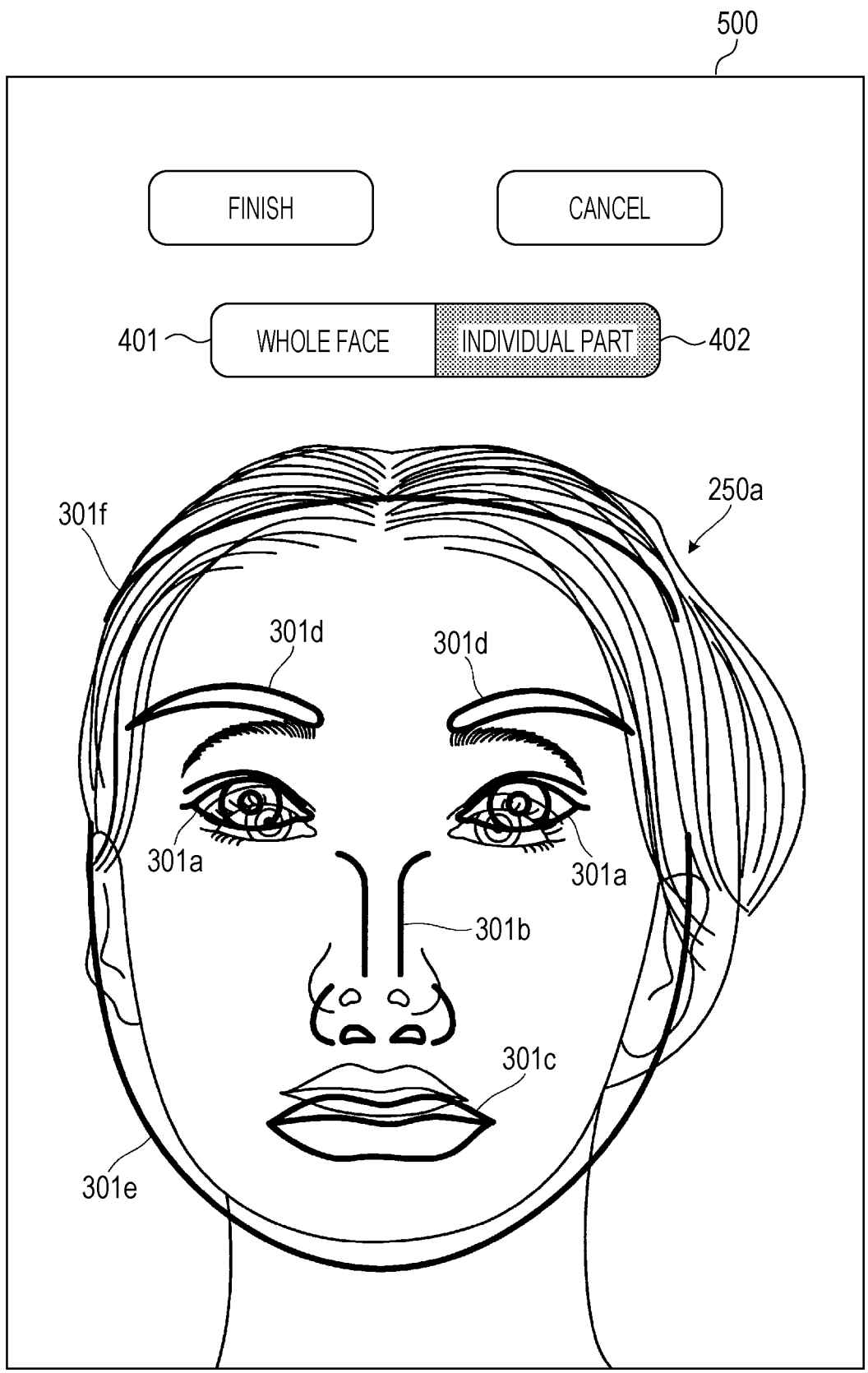
FIG. 13 is a diagram showing an example of a facial part mark setting UI according to an embodiment.

FIG. 13 shows an example of the facial part mark UI 500 displayed in S103 of FIG. 7. As mentioned above, the facial part mark UI 500 is used when recognition of the facial part is unsuccessful.

As in FIGS. 11 and 12, the facial part mark UI 500 has the whole face button 401 and the individual part button 402. Since the facial part recognition unit 202 has failed to recognize the facial part, and the position of the facial part is not clarified, in the UI 500 of facial part mark 301, the facial part mark 301 of the default shape may be disposed at the default (pre-registered) position.

As in the case of FIGS. 11 and 12, the user 2 operates the facial part mark UI 500 to redispose (correct) the facial part mark 301 at the position of the facial part corresponding to the facial part mark.

In a case where face detection fails, when disposing the facial part mark 301, in the facial part mark UI 500, the user may specify the eye position on the face image, and the other facial part marks 301 may be automatically disposed at positions relative to the specified eye position according to the default setting. This is because the most featured part is the eyes in the face part arrangement.

In addition, the procedure of correction of the facial part mark 301 when recognition of the facial part is unsuccessful may be determined in advance. For example, as in any of the following (A1) to (A3), a correction procedure may be determined in advance.

(A1) First, in the facial part mark UI 500, the facial part mark UI unit 203 displays a UI for correcting the facial part mark 301 with respect to the whole face (for example, FIG. 11), and then displays a UI for correcting the facial part mark 301 for facial part (for example, FIG. 12). According to the A1, since the user 2 can correct the facial part mark 301 without getting confused, the efficiency of the correction work of the facial part mark 301 is improved.

(A2) When a facial part mark 301 successfully recognized in the past for the same user 2 exists in the database 20, the facial part mark UI unit 203 uses the facial part mark 301 as a default facial part mark 301. The past facial part mark 301 of the same user 2 is likely to be more applicable to the user 2 than the default facial part mark 301. Therefore, according to the A2, it is possible to reduce the time and effort of correcting the facial part mark.

(A3) The facial part mark UI unit 203 uses the face image of the same user 2 captured a plurality of times to analogize the facial part mark 301. For example, when recognition of the facial part is successful in the left side face, and recognition of the facial part is unsuccessful in the right side face, the facial part mark UI unit 203 uses, as the default facial part mark 301 in the right side face whose recognition is unsuccessful, the facial part mark (for example, FIG. 9) 301 corresponding to the left side face successfully recognized. The facial part mark 301 analogized from the face image of the same user 2 is likely to be more applicable to the user 2 than the default facial part mark 301. Therefore, according to the A3, it is possible to reduce the time and effort of correcting the facial part mark.

Next, referring to FIGS. 14 to 16, the relationship between the feature points of the face image and the facial part mark 301 will be described.

As mentioned above, the facial part recognition unit 202 extracts feature points 610 of a facial part 601 from the face image. Also, as shown in FIG. 14, a facial part mark 602 has points (hereinafter referred to as "constituent points") 620 which constitute a shape corresponding to the facial part 601.

When the facial part recognition unit 202 succeeds in recognizing the facial part 601, the facial part mark UI unit 203 may transform the shape of the default facial part mark 602 into the shape of the facial part 601 that has been successfully recognized. In addition, in the shape transformation, the relative positions of the plurality of constituent points 620 of the default facial part mark 602 may be transformed to match the relative positions of the plurality of feature points 610 of the recognized facial part 601.

Figure 14:
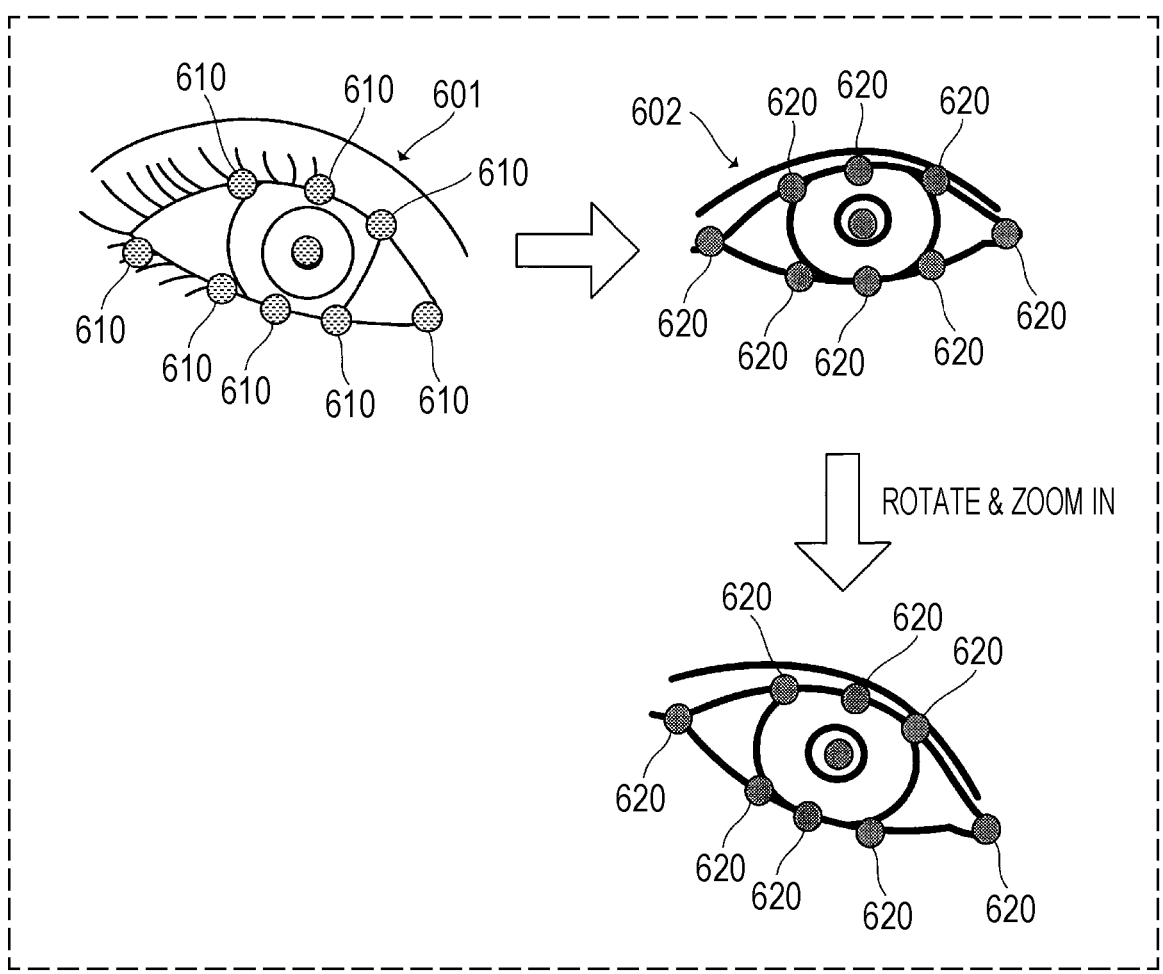
FIG. 14 is a diagram showing an example in which the shape of a facial part mark is transformed to the shape of a facial part according to an embodiment.
Figure 15:
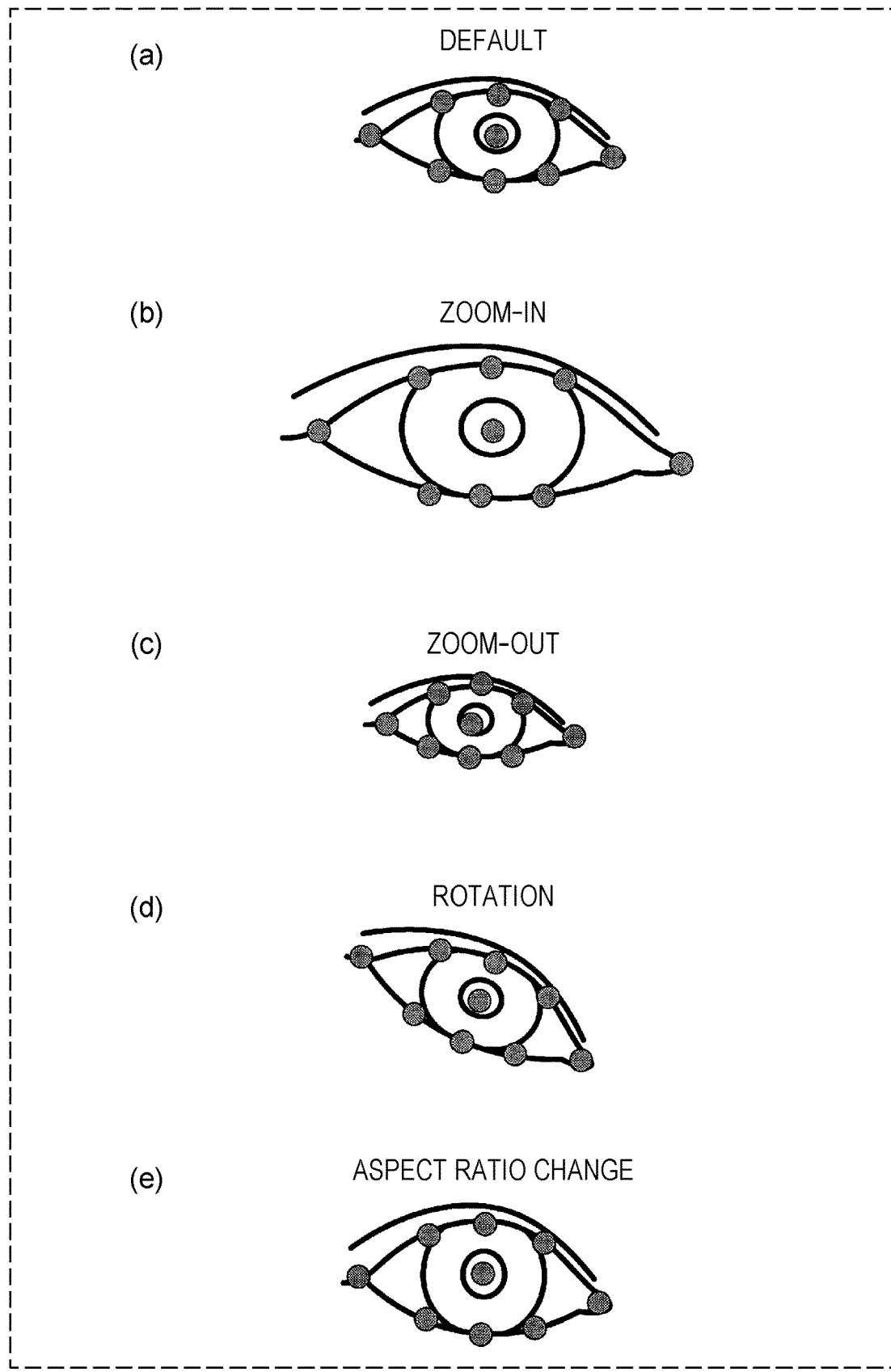
FIG. 15 is a diagram showing an example of a transformation pattern of a facial part mark according to an embodiment.

For example, as shown in FIG. 14, the facial part mark UI unit 203 transforms the relative positions of the constituent points 620 of the facial part mark 602 of the eye so that it matches the relative positions of the feature points 610 extracted from the eye portion of the face image. As illustrated in FIGS. 15(a) to 15(b), this transformation may include at least one of zoom-in, zoom-out, rotation, and aspect ratio change. As a result, since it is possible to generate the facial part mark 602 fit for the facial part 601 of the user 2, it is possible to reduce the time and effort of correcting the constituent points 620.

Also, the feature points 610 of the recognized facial part 601 may be associated with the constituent points 620 of the facial part mark 620 corresponding to the facial part 601. In this case, when the facial part mark 602 is corrected in the facial part mark correction UI 400, the facial part mark UI unit 203 may correct the feature points 610 associated with the constituent points 620 of the facial part mark 602. That is, the facial part mark UI 400 can be said to be a UI that can easily correct the feature points 610 of the recognized facial part 601.

Also, when the facial part mark 602 is disposed in the facial part mark UI 500, the facial part mark UI unit 203 may set, as the feature points 610 of the facial part 601 corresponding to the facial part mark 602, the constituent points 620 of the disposed facial part mark 602 in the face image.

Figure 16:
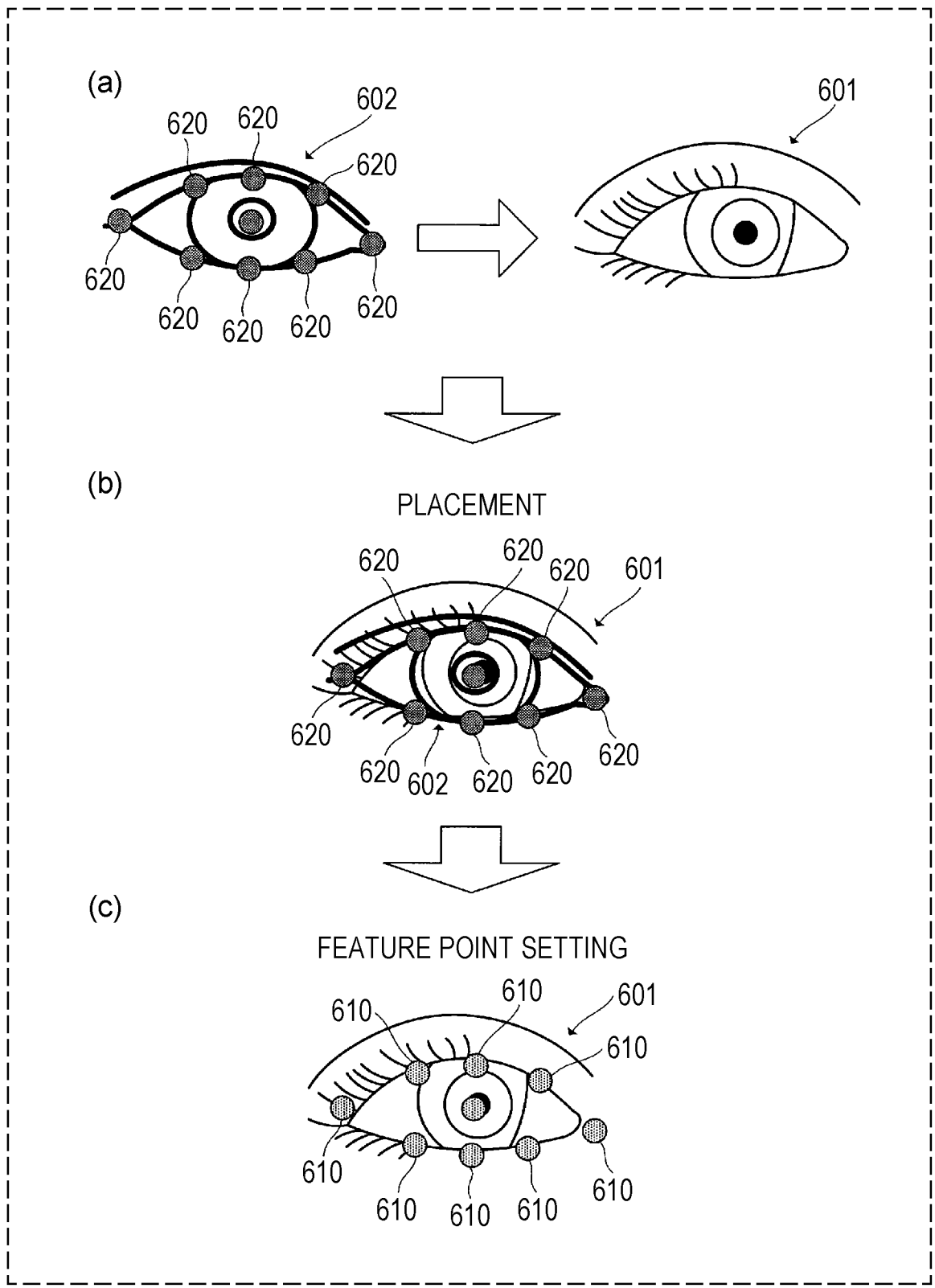
FIG. 16 is a diagram showing an example of setting feature points of a facial part using the facial part mark according to an embodiment.

For example, as shown in FIG. 16, in the facial part mark UI 500, the user 2 transforms the facial part mark 602 of the eye so that it is fit to the facial part "eye" 601 to dispose the transformed facial part mark 602 at the position of the facial part "eye" 601. Next, as shown in FIG. 16C, the facial part mark UI 203 sets, as the feature points 610 of the facial part "eye" 601, the constituent points 620 of the disposed facial part mark 601 in the face image.

As a result, even when recognition of the facial part is unsuccessful, the feature points 610 of the facial part 601 can be easily set. That is, the facial part mark UI 500 can be said to be a UI that can easily set the feature points 610 of the facial part 601.

Details of Analysis Region Setting Unit

Figure 17:
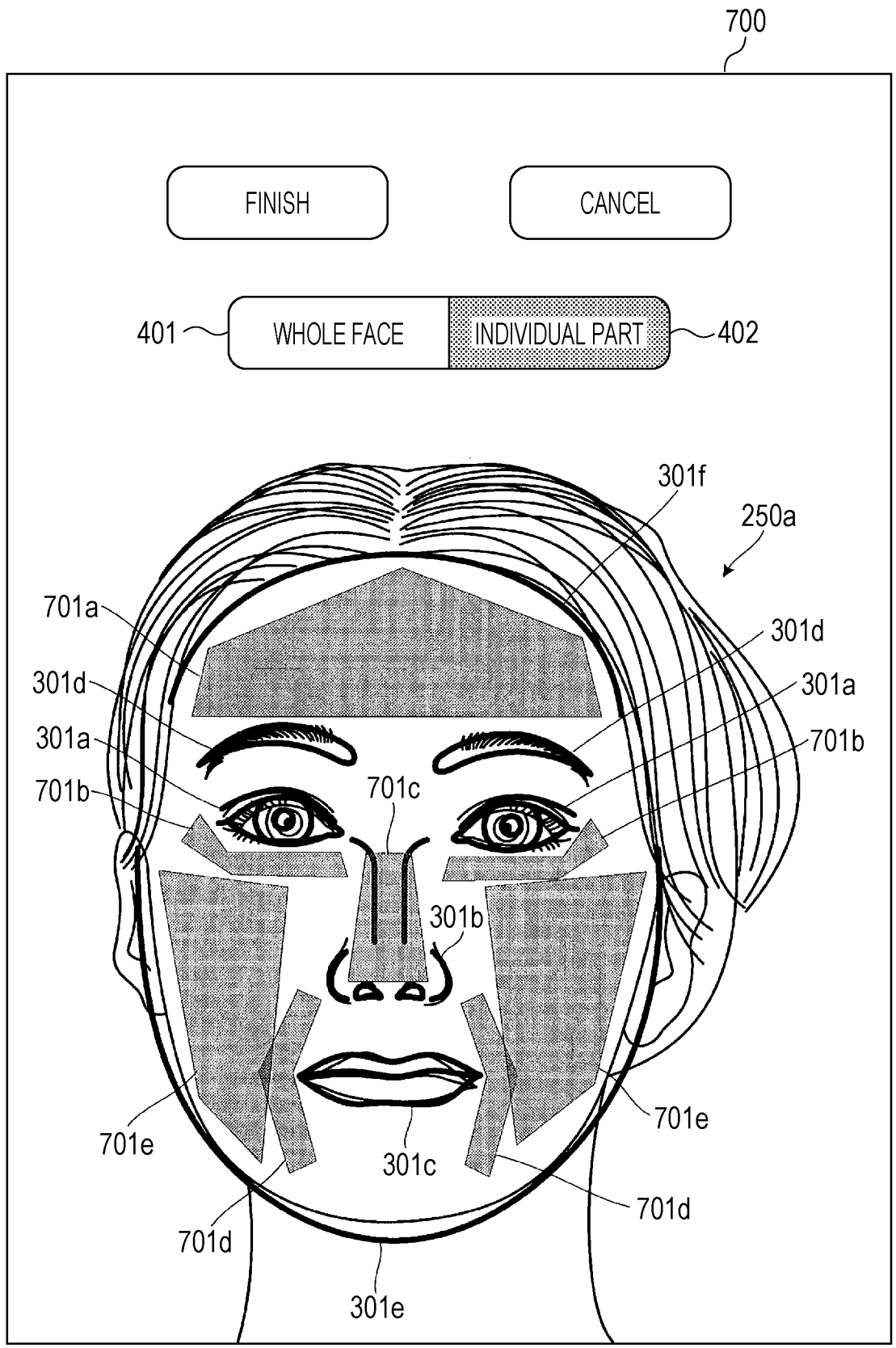
FIG. 17 is a diagram showing an example of a validation screen of a skin analysis region according to an embodiment.

FIG. 17 shows an example of a UI 700 of the skin analysis region. Next, referring to FIG. 17, the analysis region setting unit 204 will be described in detail.

The analysis region setting unit 204 set the skin analysis region for the face image based on the position of each facial part mark 301. Alternatively, the analysis region setting unit 204 may set the skin analysis region for the face image based on the feature points of the facial part. Note that the feature points of the facial part may be corrected by the facial part mark UI 400.

As illustrated in FIG. 17 the analysis region setting unit 204 may set, as a forehead skin analysis region 701a, a region between the facial part mark 301f of the hairline of hair and the facial part mark 301d of the eyebrows. Further, the analysis region setting unit 204 may set, as a skin analysis region 701b of around the eyes, a predetermined region under the facial part mark 301a of the eyes. In addition, the analysis region setting unit 204 may set, as a skin analysis region 701c of the nose, the overlapping area of the facial part mark 301b of the nose. Further, the analysis region setting unit 204 may set, as a skin analysis region 701d of around the mouth, predetermined left and right area of the facial part mark 301c of the mouth. Further, the analysis region setting unit 204 may set, as a skin analysis region 701e of the cheek, a predetermined region surrounded by the facial part mark 301e of the facial contour, the facial part mark 301a of the eyes, the facial part mark 301b of the nose, and the facial part mark 301c of the mouth.

In addition, as shown in FIG. 17, the facial part mark UI unit 203 may generate a UI 700 of the skin analysis region including the skin analysis region set by the analysis region setting unit 204, the face image, and the facial part mark, and may display it on the display 102. As a result, the user 2 can determine whether the skin analysis region is set correctly.

In addition, the facial part mark UI unit 203 may also display the skin analysis region set by the analysis region setting unit 204 in the facial part mark UI 400. In this case, the analysis region setting unit 204 may reset the skin analysis region in real time according to the correction of the facial part mark. The facial part mark UI unit 203 may display the reset skin analysis region in the facial part mark UI 400 in real time. As a result, the user 2 can correct the facial part mark so that the skin analysis region is correctly set.

In addition, the skin analysis performing unit 205 may apply a known image processing technique to each skin analysis region set as described above, and may perform the skin analysis. The skin analysis performing unit 205 may perform different skin analyses for respective skin analysis regions. For example, the skin analysis performing unit 205 may analyze the amount of wrinkles for the forehead skin analysis region 701*a*, the around-eye skin analysis region 701*b*, and the around-mouth skin analysis region 701*d*. In addition, the skin analysis performing unit 205 may analyze the amount of pores for the nose skin analysis region 701*c*. In addition, the skin analysis performing unit 205 may analyze the amount of stains and pores for the cheek skin analysis region 701*e*.

Note

When the facial part recognition unit 202 fails to recognize the facial part in the face image, the face image may be associated with information such as the position of the facial part mark disposed through the operation of the facial part mark UI unit 203. By implementing machine learning using the correspondence relationship, it is also possible to improve the accuracy of facial part recognition in the facial part recognition unit 202.

Also, in the above, in S107 of FIG. 7, the facial part mark UI unit 203 displays a screen as shown in the UI 300 of FIGS. 8 to 10, and urges the user 2 to validate the positional relationship between the facial part and the facial part mark. In S107 of FIG. 7, the facial part mark UI unit 203 may display a screen including a skin analysis region as illustrated in FIG. 17, and urge the user 2 to validate the positional relationship between the facial part, the facial part mark, and the skin analysis region.

Summary of the Disclosure

In the present embodiment, the skin analyzer 10 includes a facial part recognition unit 202 that recognizes a facial part from a face image of the user 2 captured by the camera 101, a facial part mark UI unit 203 that causes the display 102 to display a facial part mark UI in which the facial part mark 301 indicating a facial part is disposed on the face image, and that accepts an operation with respect to the facial part mark 301, the analysis region setting unit 204 that sets a skin analysis region for the face image based on the position of the operated facial part mark 301, and the skin analysis performing unit 205 that performs a skin analysis on the set skin analysis region. According to the configuration, for example, the following effects (1) and (2) can be obtained.

(1) In the conventional configuration represented by International Publication No. 2015/015793, when a face image that does not fall within the allowable range of the facial part recognition unit 202 is captured, recognition of the facial part is unsuccessful, and it is not possible to set the skin analysis region. Typically, recognition of the facial part is unsuccessful when the facial part is photographed with part of the facial part hidden by the hair, or when at the time of capturing the face image of the side face, the angle of the side face is too deep to photograph the facial part such as the eyes. On the other hand, according to the skin analyzer 10 according to the present embodiment, it is possible to set a skin analysis region by setting (correcting) information on the facial part through the operation of the facial part mark UI unit 203.

(2) In the conventional configuration, since the hair area included in the skin analysis region may affect the skin analysis results, one of the problems at medical sites such as the cosmetic dermatology is that the hair area is excluded from the skin analysis region. On the other hand, according to the skin analyzer 10 according to the present embodiment, the facial part such as the hairline of hair can be specified through the operation of the facial part mark UI unit 203, so that the hair area can be easily and properly excluded.

The embodiments according to the present disclosure have been described above in detail with reference to the drawings. The functions of the skin analyzer 10 described above can be implemented by a computer program.

Figure 18:
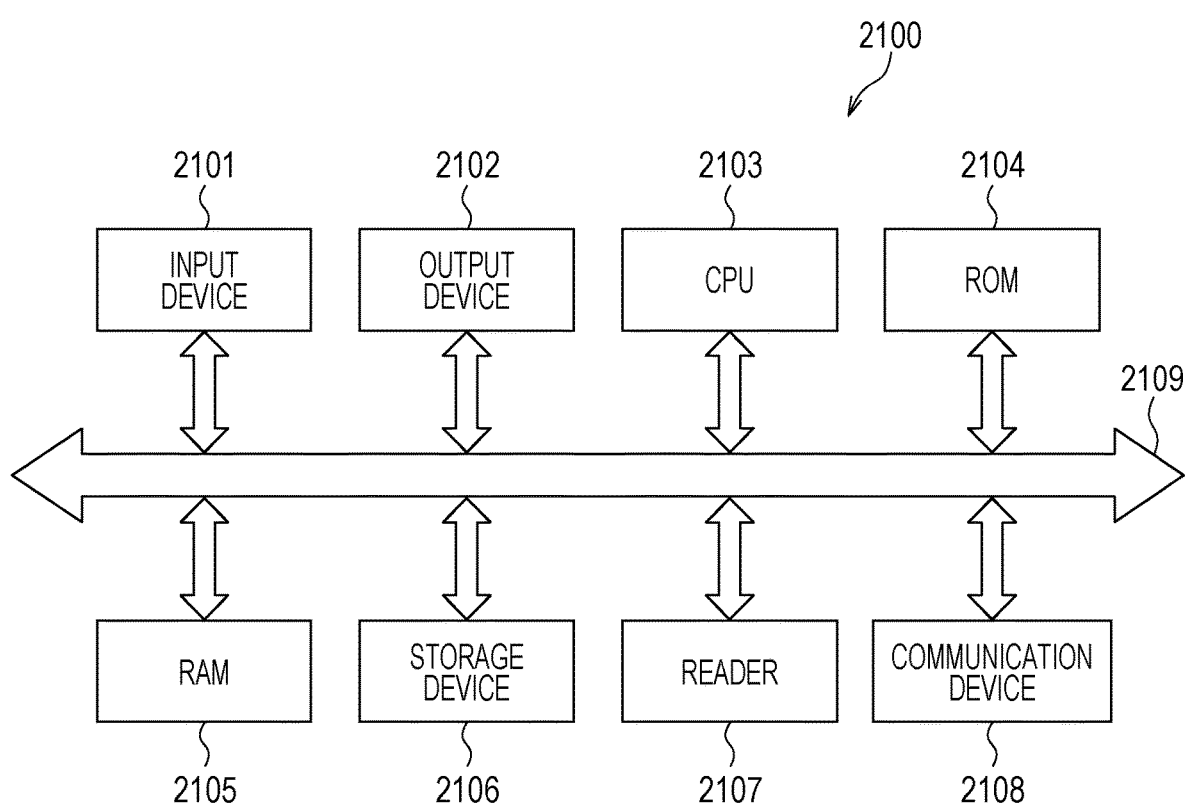
FIG. 18 is a diagram showing an example of a hardware configuration according to an embodiment of the present disclosure.

FIG. 18 is a diagram illustrating a hardware configuration of a computer that implements the functions of the respective devices by the program. The computer 2100 includes an input device 2101 such as a keyboard, a mouse or a touch pad, an output device 2102 such as a display or a speaker, a central processing unit (CPU) 2103, a read only memory (ROM) 2104, and a random access memory (RAM) 2105, a storage device 2106 such as a hard disk drive or a solid state drive (SSD), a digital versatile disk read only memory (DVD-ROM), a reader 2107 that reads information from a recording medium such as a Universal Serial Bus (USB) memory or the like, and a communication device 2108 that performs communication via a network, and the respective units are connected with each other through a bus 2109.

The reader 2107 reads the program from the recording medium storing the program for implementing the function of each device described above, and causes the storage device 2106 to store the program. Alternatively, the communication device 2108 communicates with a server device connected to the network, and the program for implementing the function of each device downloaded from the server device is stored in the storage device 2106.

The CPU 2103 copies the program stored in the storage device 2106 to the RAM 2105, and sequentially reads out commands included in the program from the RAM 2105, so that the functions of the above-described devices are implemented.

The present disclosure can be implemented in software, hardware, or software in conjunction with hardware.

Respective functional blocks used in the description of the above embodiment may be partially or collectively implemented through an LSI, which is an integrated circuit, and respective processes described in the above embodiments may be partially or collectively controlled by one LSI or a combination of the LSIs. The LSI may be composed of individual chips, or may be composed of one chip so as to include some or all of the functional blocks. The LSI may have data inputs and outputs. The LSI may be referred to as an IC, a system LSI, a super LSI, or an ultra LSI depending on different levels of integration.

The method for circuit integration is not limited to LSI. It may be implemented by a dedicated circuit, a general purpose processor or a dedicated processor. In addition, a field programmable gate array (FPGA) that can be programmed after LSI manufacturing, or a reconfigurable processor where connections and settings of circuit cells within the LSI can be restructured may be used. The present disclosure may be implemented as digital processing or analog processing.

Moreover, when integrated circuit technology comes out to replace the LSI as a result of the advancement of semiconductor technology or a derivative other technology, naturally, integration of functional blocks may be performed using the technology. The technology may include the application of biotechnology and the like.

An aspect of the present disclosure is useful for a system that recognizes part of the human body.

What is claimed is:

1. A skin analyzer comprising:
a processor that
recognizes a facial part from a face image of a user captured by a camera;
causes a display to display a user interface in which a facial part mark indicating the facial part is disposed on the face image, and that accepts an operation with respect to the facial part mark;
sets a skin analysis region for the face image based on a position of the operated facial part mark;
performs a skin analysis on the set skin analysis region, wherein
a) the processor determines whether recognition of the facial part is successful;
b) when the processor determines that recognition of the facial part is successful, the processor displays the facial part mark on the face image;
c) when the processor determines that recognition of the facial part is unsuccessful, the processor
displays the facial part mark at a default position on the face image,
accepts user input repositioning the facial part mark from the default position to a correct position of the corresponding facial part, and moves the facial part mark to the correct position in response to the user input, and
determines the position of repositioned facial part mark in response to receiving a completion instruction from the user;
d) in response to determining that recognition of the facial part is successful, and displaying of the facial part mark on the successfully recognized facial part, the processor displays
the facial image,
the recognized facial part,
the facial part mark at the recognized facial part,
a correctly-disposed input area accepting input of the user indicating that the facial part mark is correctly disposed at the recognized facial part, and
an adjustment-required input area accepting input of the user indicating that the facial part mark is not correctly disposed at the recognized facial part;
e) in response to receiving an input from the correctly-disposed input area, the processor determines the position of the facial part mark;
f) in response to receiving an input from the adjustment-required input area, the processor accepts user input repositioning the facial part mark to a correct position of the facial part, and moves the facial part mark to the correct position in response to the user repositioning input; and
g) after repositioning of the facial part mark, in response to receiving a user completion instruction representing completion of the repositioning, the processor determines the position of the facial part mark.

2. The skin analyzer according to claim 1, wherein
when the processor determines that recognition of the facial part is unsuccessful, the processor disposes the facial part mark when recognition is successful in another face image of the user in the face image.

3. The skin analyzer according to claim 1, wherein
when the processor determines that recognition of the facial part is unsuccessful, the processor disposes the facial part mark disposed by the operation with respect to another face image of the user in the face image.

4. The skin analyzer according to claim 2, wherein
the another face image is a past face image obtained by photographing the user.

5. The skin analyzer according to claim 2, wherein
each of the face image and the another face image is any of a face image of a front face, a face image of a left side face, and a face image of a right side face which are obtained by photographing the user.

6. The skin analyzer according to claim 5, wherein
the processor determines that recognition of the facial part is unsuccessful when face sizes of the face image of the front face, the face image of the left side face, and the face image of the right side face are different by a predetermined amount or more.

7. The skin analyzer according to claim 1, wherein
the facial part is at least one of a facial contour, eyes, a nose, a mouth, eyebrows and a hairline of hair, and the facial part mark has a shape corresponding to a shape of the facial part.

8. A skin analysis method comprising:
by a skin analyzer,
recognizing a facial part from a face image of a user captured by a camera;
causing a display to display a user interface in which a facial part mark indicating the facial part is disposed on the face image, and accepting an operation with respect to the facial part mark;
setting a skin analysis region for the face image based on a position of the operated facial part mark;
performing a skin analysis on the set skin analysis region;
a) determining whether recognition of the facial part is successful;
b) when the determining determines that recognition of the facial part is successful, the skin analyzer displays the facial part mark on the face image;
c) when the determining determines that recognition of the facial part is unsuccessful, the skin analyzer
displays the facial part mark at a default position on the face image,
accepts user input repositioning the facial part mark from the default position to a correct position of the corresponding facial part, and moves the facial part mark to the correct position in response to the user input, and
determines the position of repositioned facial part mark in response to receiving a completion instruction from the user;
d) in response to determining that recognition of the facial part is successful, and displaying of the facial part mark on the successfully recognized facial part, the skin analyzer displays
the facial image,
the recognized facial part,
the facial part mark at the recognized facial part,
a correctly-disposed input area accepting input of the user indicating that the facial part mark is correctly disposed at the recognized facial part, and
an adjustment-required input area accepting input of the user indicating that the facial part mark is not correctly disposed at the recognized facial part;

e) in response to receiving an input from the correctly-disposed input area, the skin analyzer determines the position of the facial part mark;

f) in response to receiving an input from the adjustment-required input area, the skin analyzer accepts user input repositioning the facial part mark to a correct position of the facial part, and moves the facial part mark to the correct position in response to the user repositioning input; and g) after repositioning of the facial part mark, in response to receiving a user completion instruction representing completion of the repositioning, the skin analyzer determines the position of the facial part mark.

9. A non-transitory computer-readable recording medium storing a program to be executed in a skin analyzer, the program causing a computer of the skin analyzer to execute:

recognizing a facial part from a face image of a user captured by a camera;

causing a display to display a user interface in which a facial part mark indicating the facial part is disposed on the face image, and accepting an operation with respect to the facial part mark;

setting a skin analysis region for the face image based on a position of the operated facial part mark;

performing a skin analysis on the set skin analysis region;

a) determining whether recognition of the facial part is successful;

b) when the determining determines that recognition of the facial part is successful, the skin analyzer displays the facial part mark on the face image;

c) when the determining determines that recognition of the facial part is unsuccessful, the skin analyzer displays the facial part mark at a default position on the face image, accepts user input repositioning the facial part mark from the default position to a correct position of the corresponding facial part, and moves the facial part mark to the correct position in response to the user input, and determines the position of repositioned facial part mark in response to receiving a completion instruction from the user;

d) in response to determining that recognition of the facial part is successful, and displaying of the facial part mark on the successfully recognized facial part, the skin analyzer displays the facial image, the recognized facial part, the facial part mark at the recognized facial part, a correctly-disposed input area accepting input of the user indicating that the facial part mark is correctly disposed at the recognized facial part, and an adjustment-required input area accepting input of the user indicating that the facial part mark is not correctly disposed at the recognized facial part;

e) in response to receiving an input from the correctly-disposed input area, the skin analyzer determines the position of the facial part mark;

f) in response to receiving an input from the adjustment-required input area, the skin analyzer accepts user input repositioning the facial part mark to a correct position of the facial part, and moves the facial part mark to the correct position in response to the user repositioning input; and g) after repositioning of the facial part mark, in response to receiving a user completion instruction representing completion of the repositioning, the skin analyzer determines the position of the facial part mark.

* * * * *